(12) United States Patent
Siemens et al.

(10) Patent No.: US 10,844,929 B2
(45) Date of Patent: Nov. 24, 2020

(54) LUBRICATED ABSORBER SYSTEM

(71) Applicant: ZF FRIEDRICHSHAFEN AG, Friedrichshafen (DE)

(72) Inventors: Kyrill Siemens, Würzburg (DE); Andreas Orlamünder, Schonungen (DE); Paul Weber, Geldersheim (DE); Peter Hammer, Schweinfurt (DE); Daniel Pittner, Frohburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/626,472

(22) PCT Filed: May 23, 2018

(86) PCT No.: PCT/EP2018/063501
§ 371 (c)(1),
(2) Date: Dec. 24, 2019

(87) PCT Pub. No.: WO2019/001851
PCT Pub. Date: Jan. 3, 2019

(65) Prior Publication Data
US 2020/0116227 A1 Apr. 16, 2020

(30) Foreign Application Priority Data
Jun. 30, 2017 (DE) .......................... 10 2017 211 204

(51) Int. Cl.
*F16F 15/14* (2006.01)
(52) U.S. Cl.
CPC ........ *F16F 15/145* (2013.01); *F16F 2230/04* (2013.01); *F16F 2232/02* (2013.01)
(58) Field of Classification Search
CPC ...... F16F 15/16; F16F 15/145; F16F 2230/04; F16F 2232/02
See application file for complete search history.

(56) References Cited

U.S. PATENT DOCUMENTS

| 2,127,888 A | 8/1938 | Sarazin |
| 2010/0175956 A1* | 7/2010 | Zadoks ................ F16F 15/145 188/268 |

(Continued)

FOREIGN PATENT DOCUMENTS

| DE | 727378 | 11/1942 |
| DE | 19954272 | 5/2001 |

(Continued)

OTHER PUBLICATIONS

Office Action for the corresponding German Patent Application No. 10 2017 211 204.2.

*Primary Examiner* — Vicky A Johnson
(74) *Attorney, Agent, or Firm* — Cozen O'Connor

(57) ABSTRACT

A mass damper system has a damper mass carrier and a damper mass movably received at the damper mass carrier a lubricant supply, a lubricant collector, and a lubricant distributor radially offset to one another with the damper mass carrier, the lubricant supply arranged at a shorter radial distance from a central axis than the lubricant collector, and the lubricant distributor arranged at a greater radial distance from the central axis than the lubricant collector to collect lubricant supplied by the lubricant supply and to guide the lubricant through the lubricant distributor to the damper mass. A stop arrangement limits a deflection path of the damper mass relative to the damper mass carrier, and the lubricant distributor has a lubricant feed that leads from the lubricant collector to a constructional unit requiring intensive lubrication.

22 Claims, 12 Drawing Sheets

(56) References Cited

U.S. PATENT DOCUMENTS

2015/0285332 A1* 10/2015 Kram .................... F16F 15/145
                                                    74/574.2
2015/0316124 A1* 11/2015 Wirachowski ........ F16F 15/145
                                                    464/51
2016/0208886 A1*  7/2016 Siemens ............... F16F 15/145
2016/0208887 A1*  7/2016 Kram .................... F16F 15/145

FOREIGN PATENT DOCUMENTS

| | | |
|---|---|---|
| DE | 10005544 | 8/2001 |
| EP | 0972965 | 1/2000 |
| EP | 2916033 | 9/2015 |
| FR | 2783297 | 3/2000 |
| WO | WO 2004067995 | 8/2004 |
| WO | WO 2009066823 | 5/2009 |
| WO | WO 2015192841 | 12/2015 |
| WO | WO-2015192841 A1 * 12/2015 ............ F16F 15/145 |

\* cited by examiner

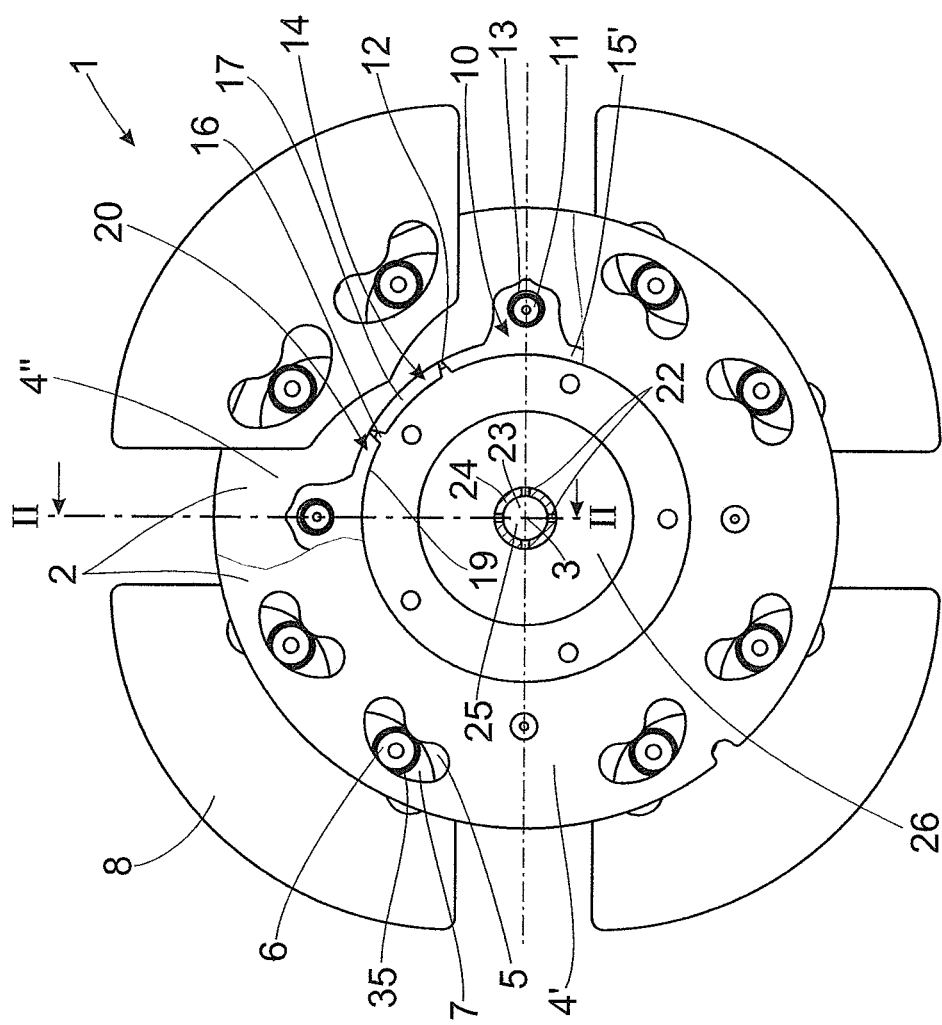
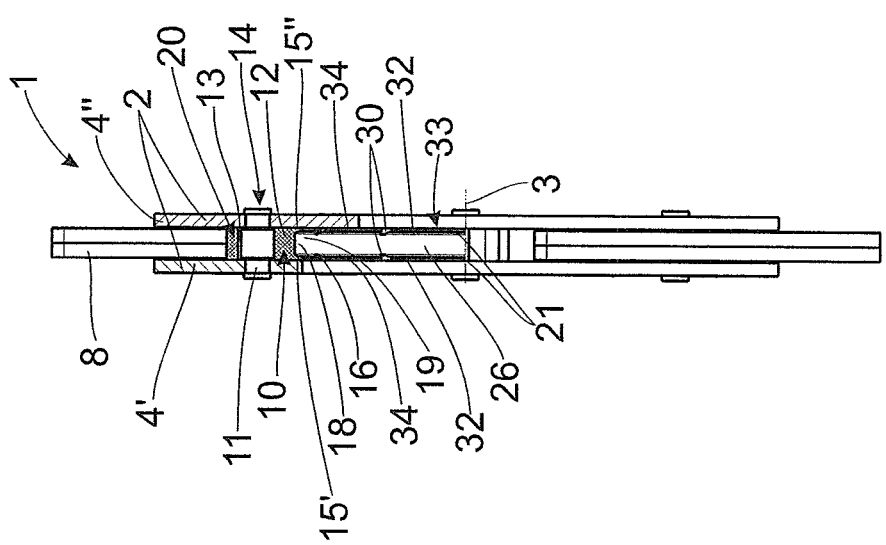

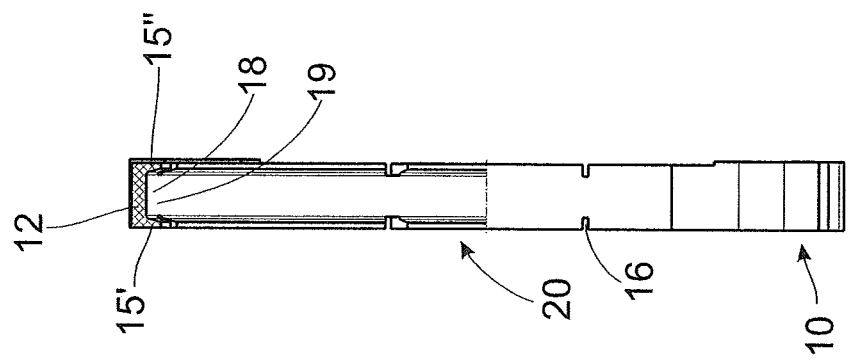
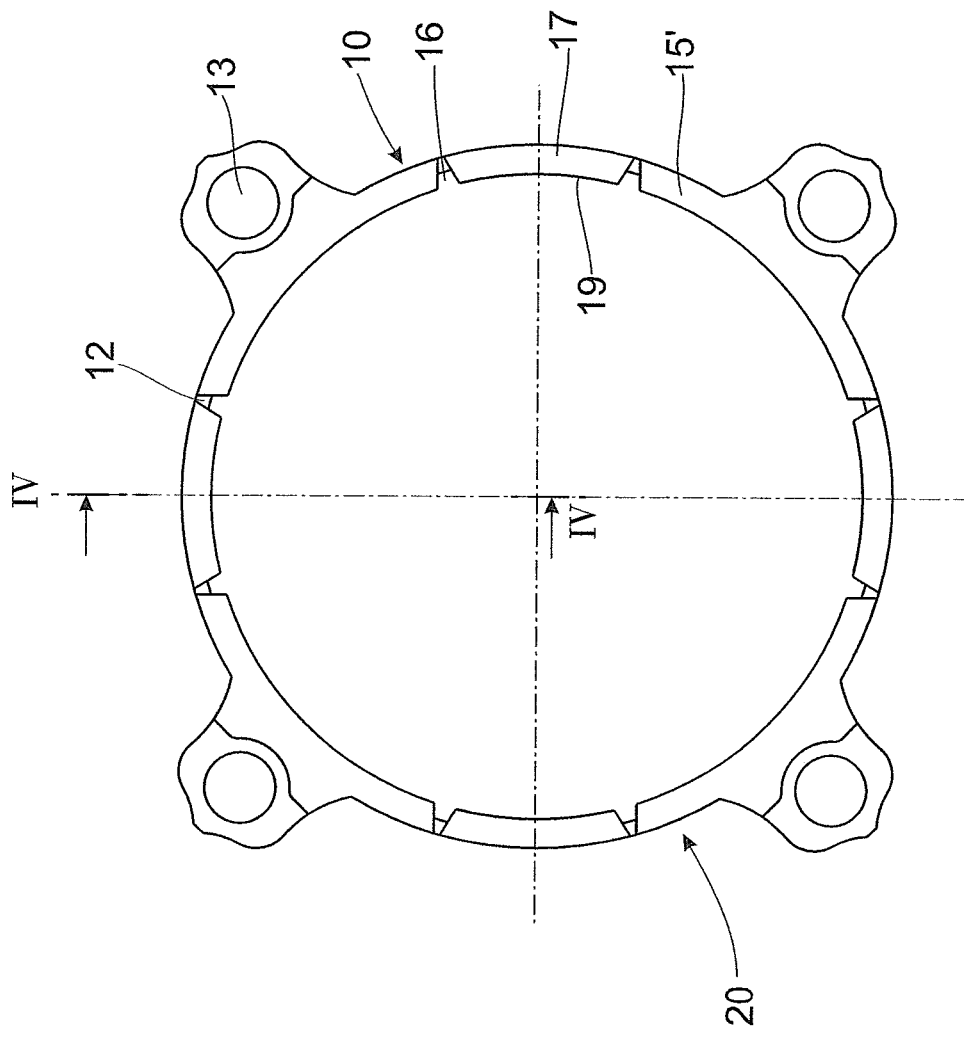

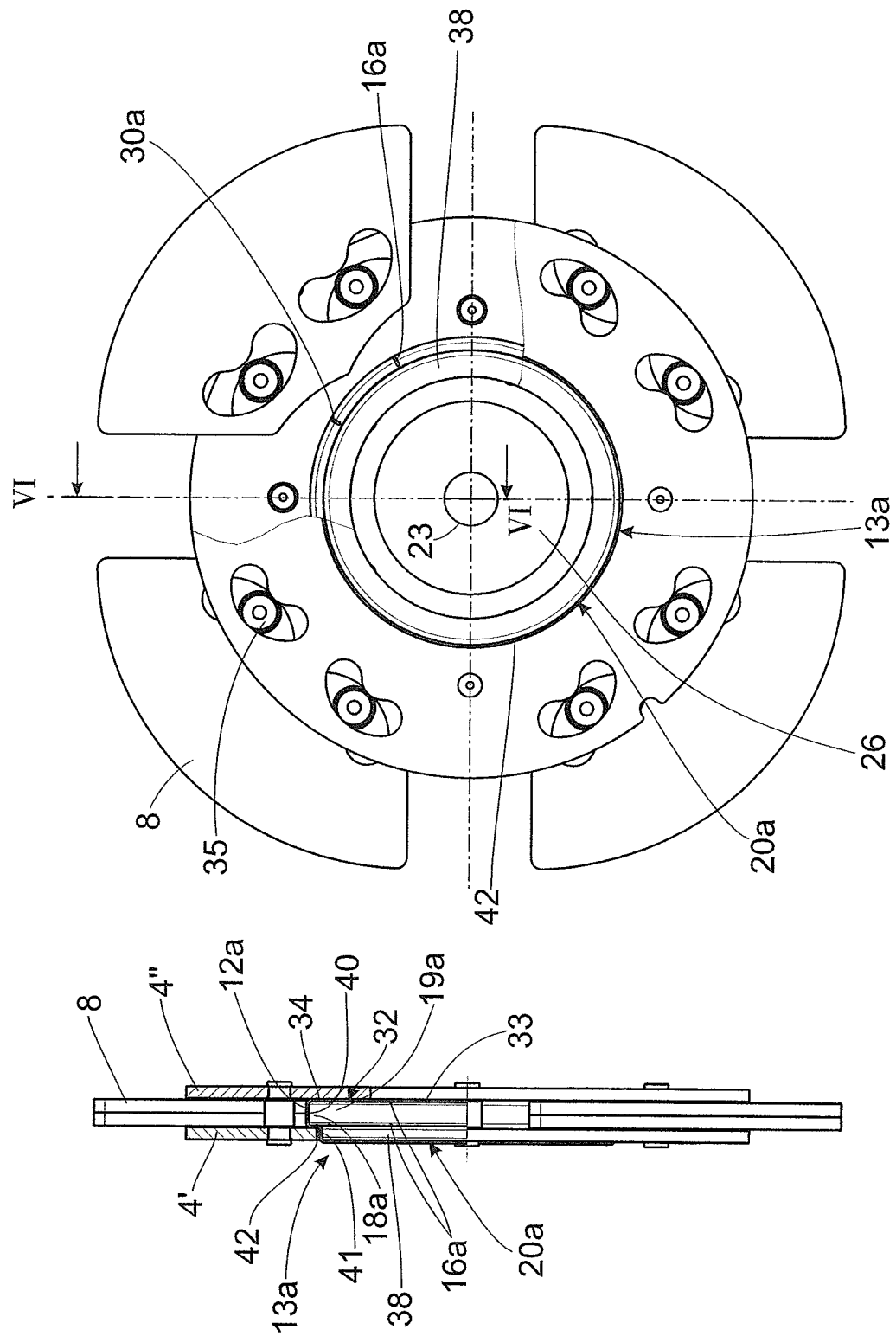

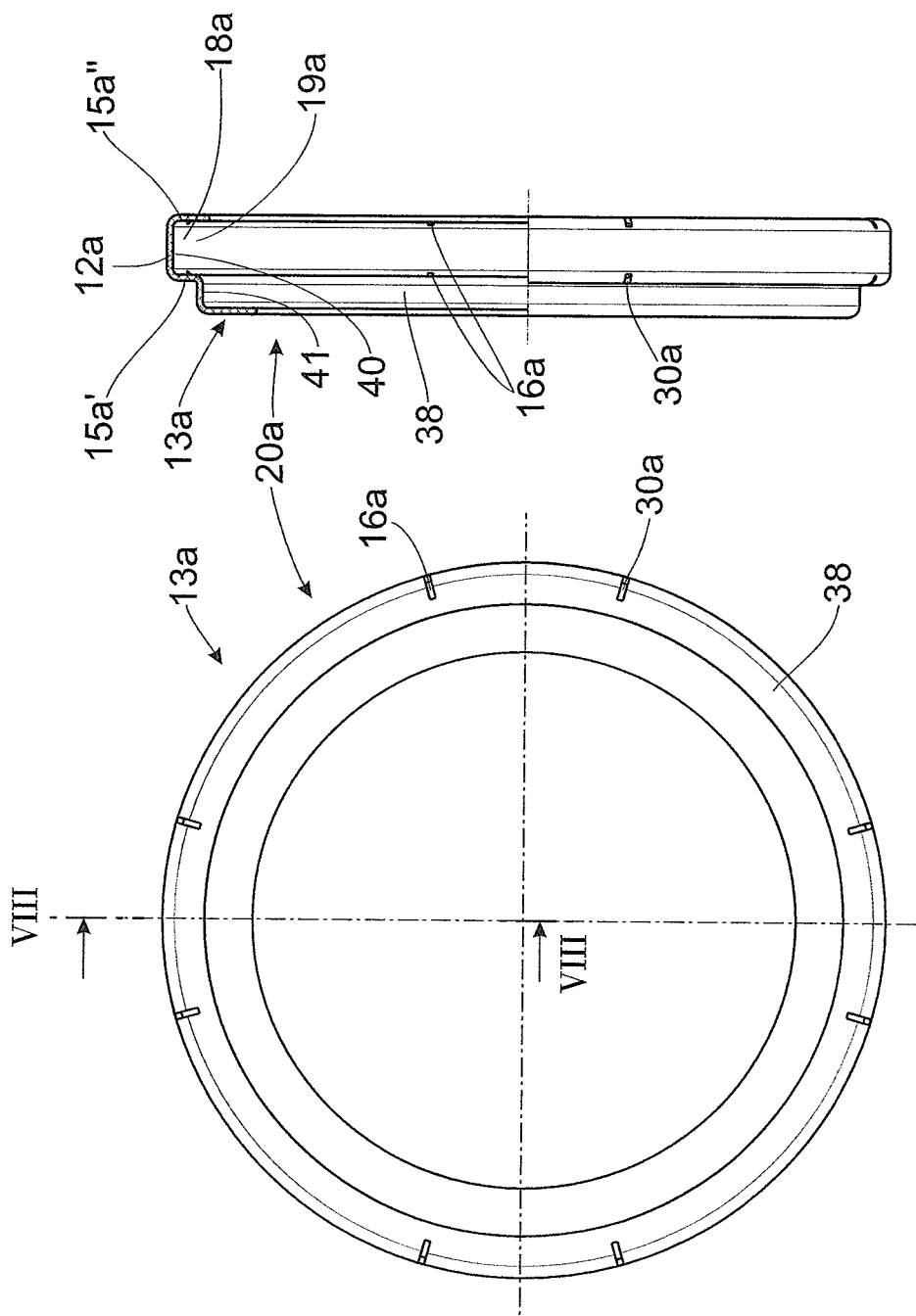

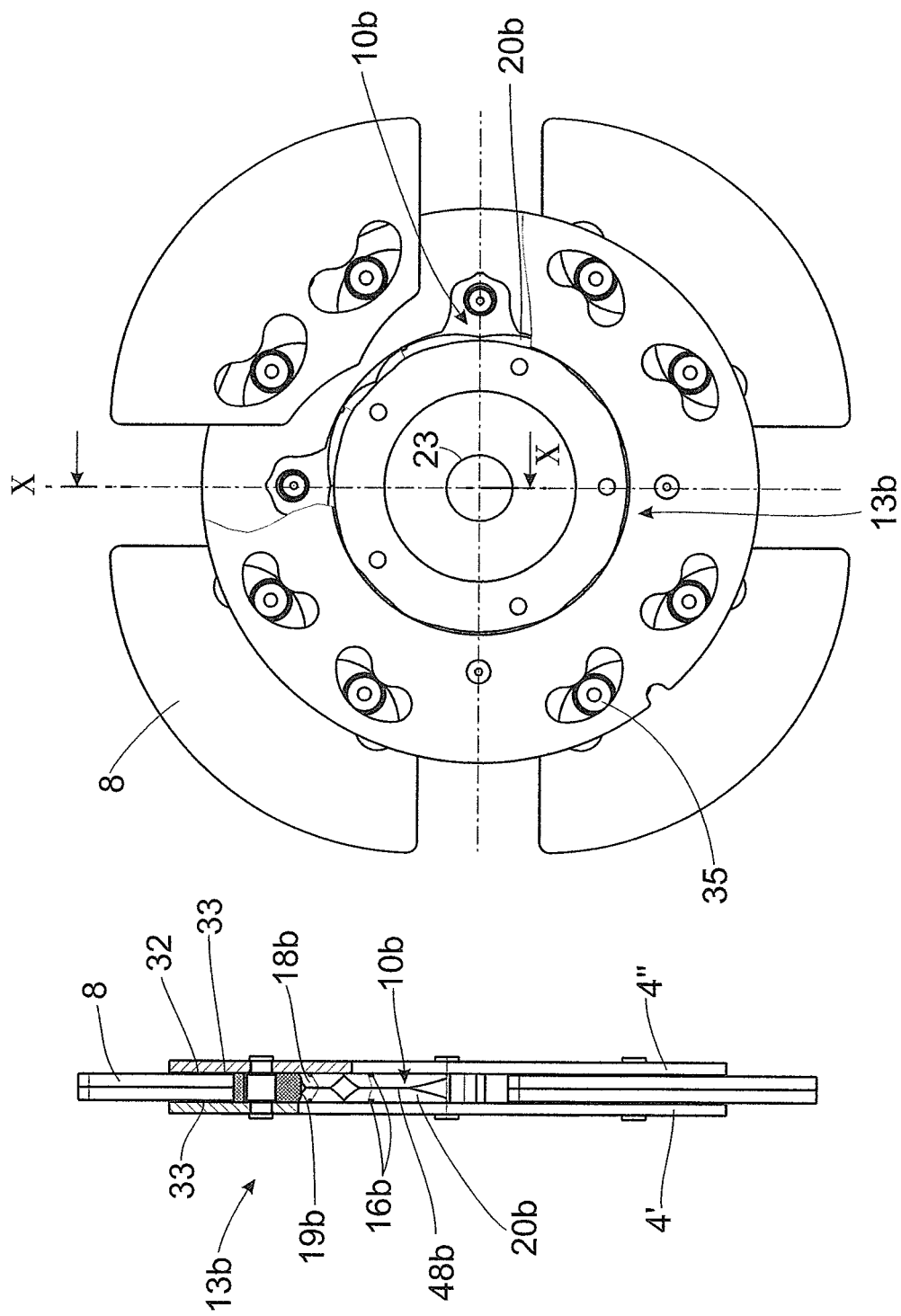

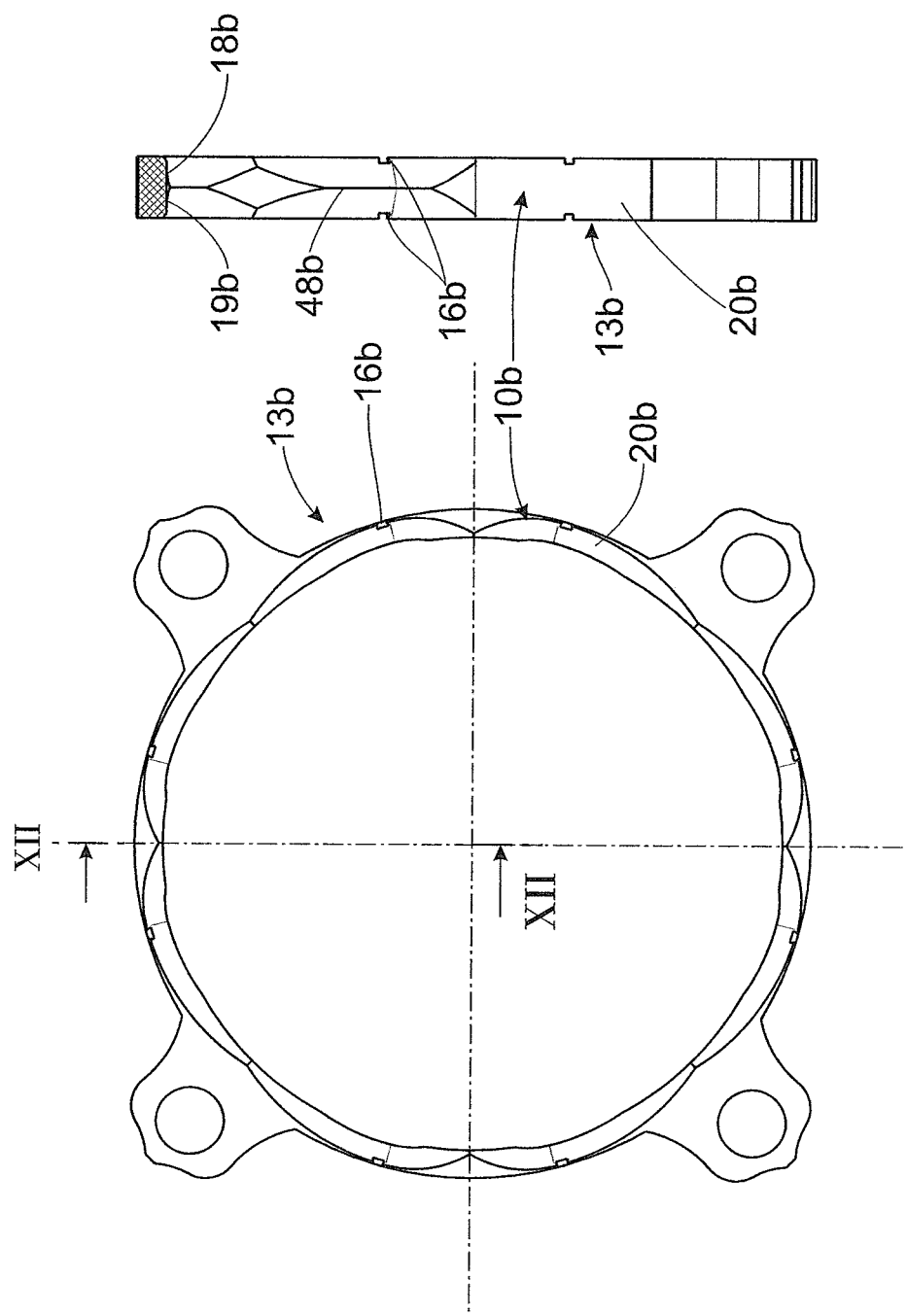

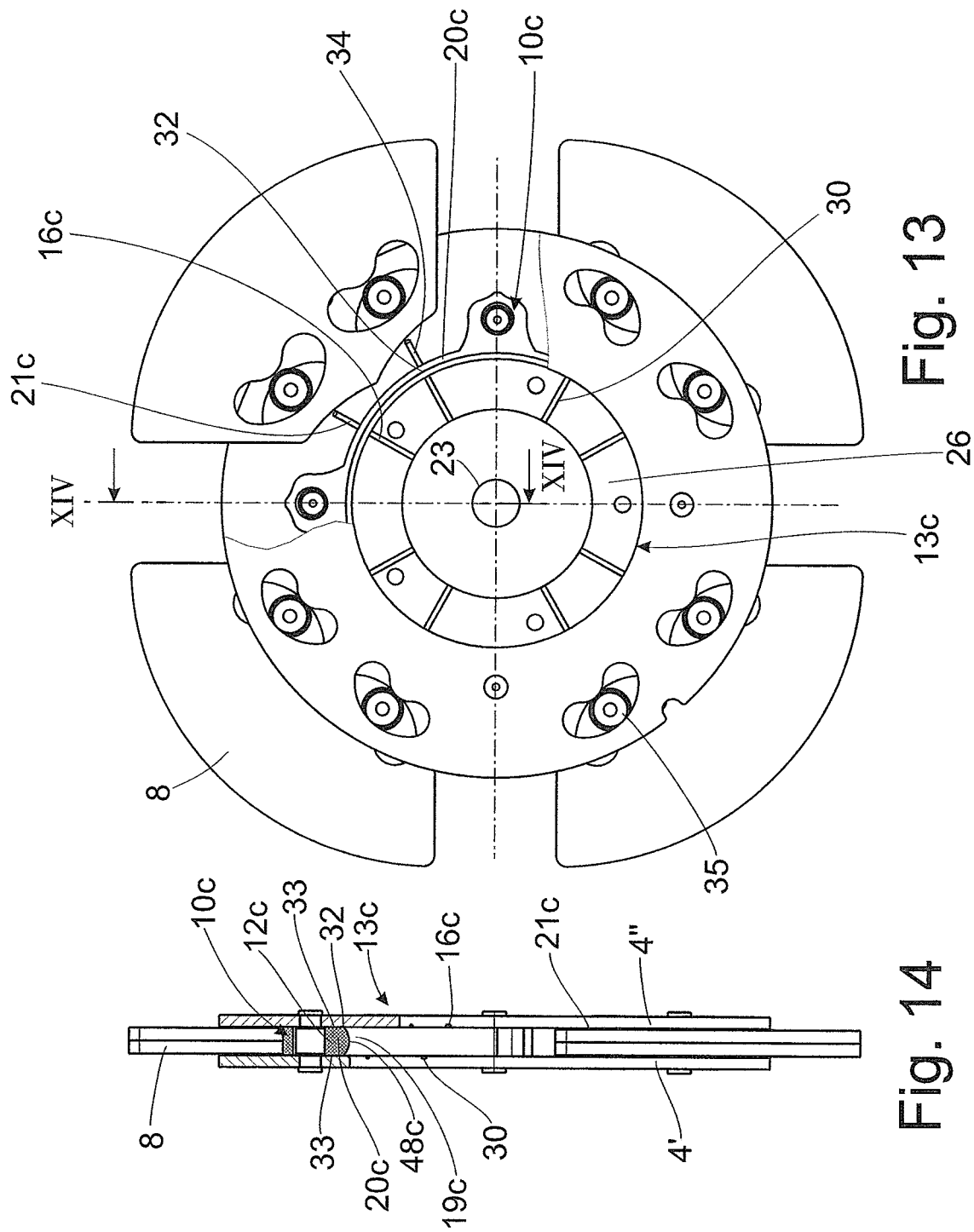

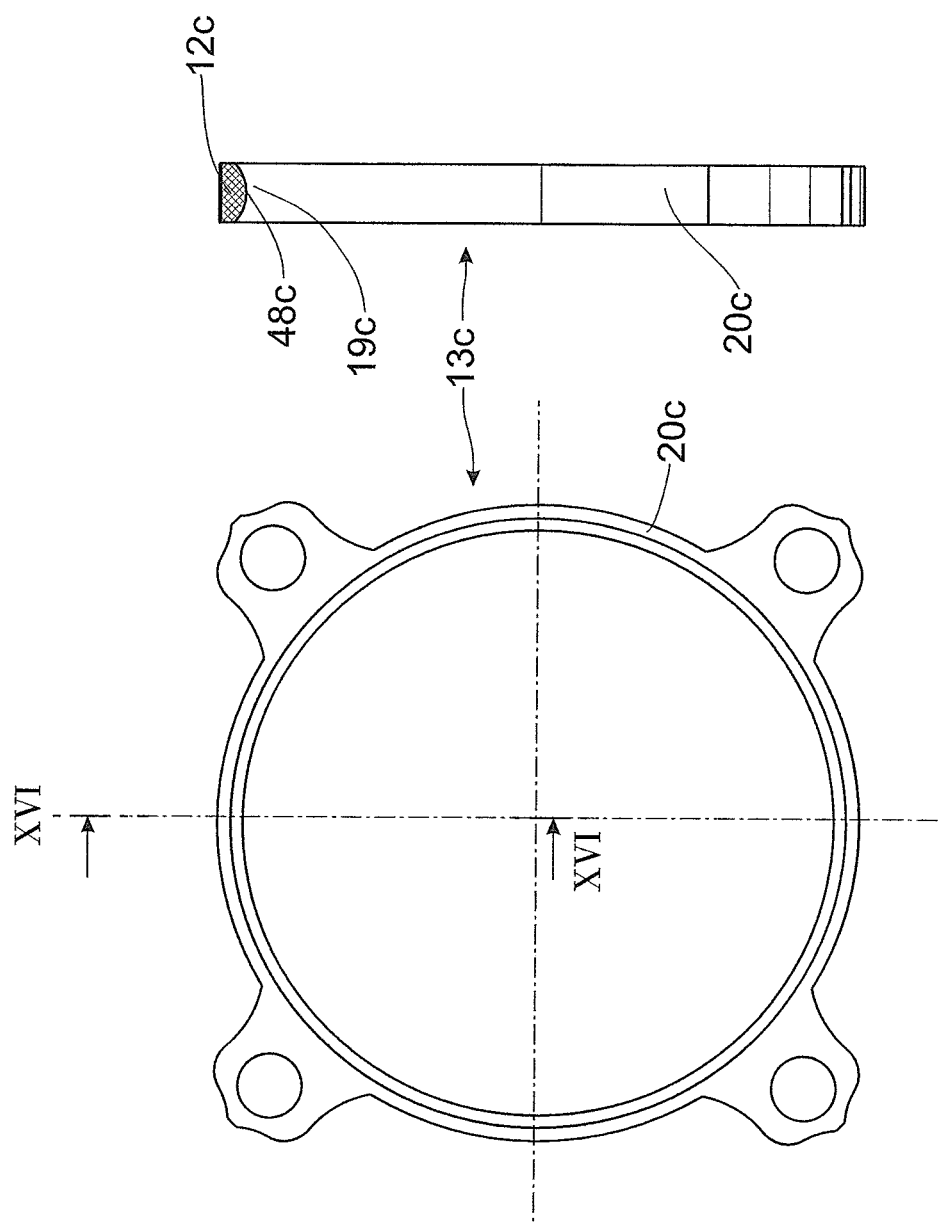

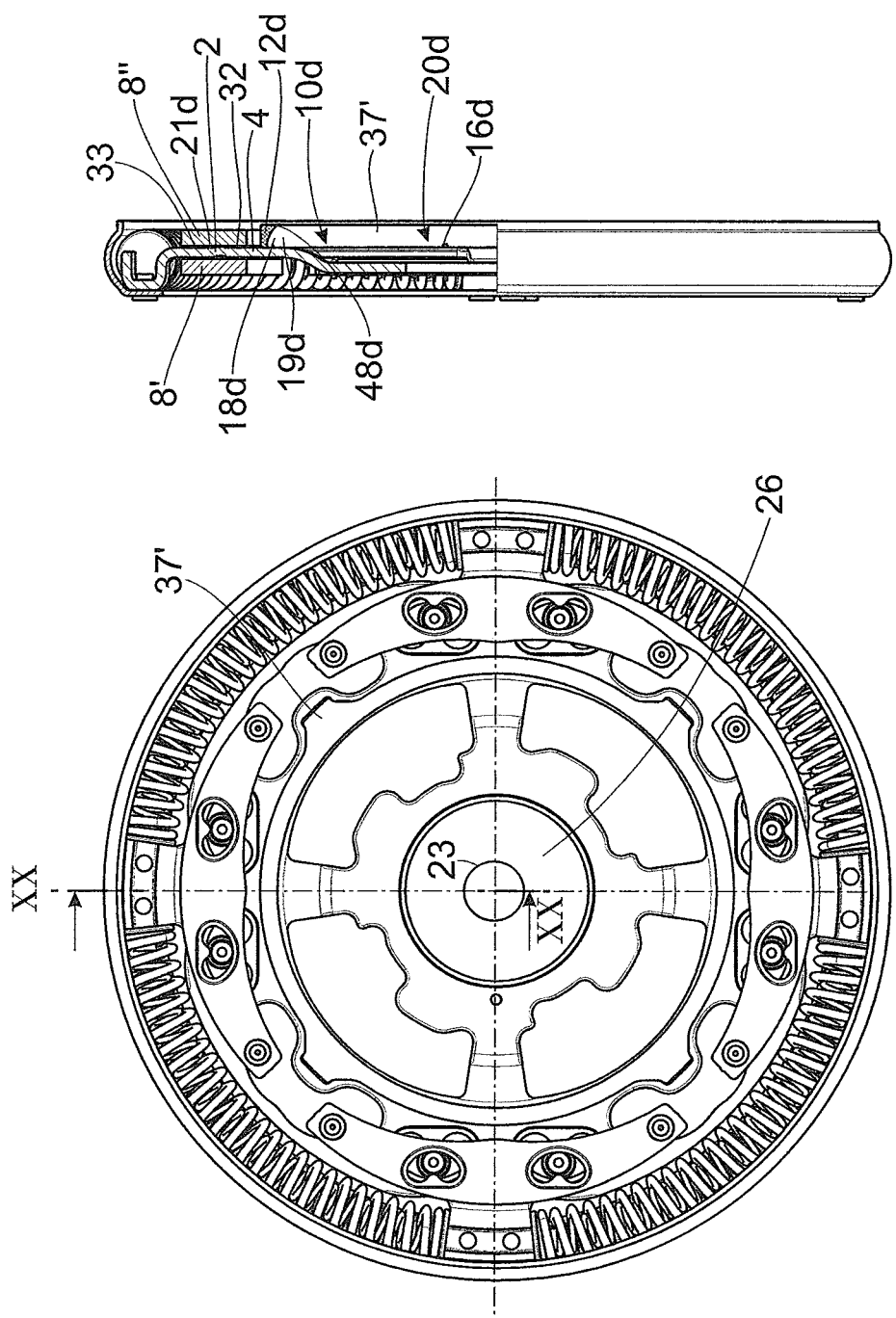

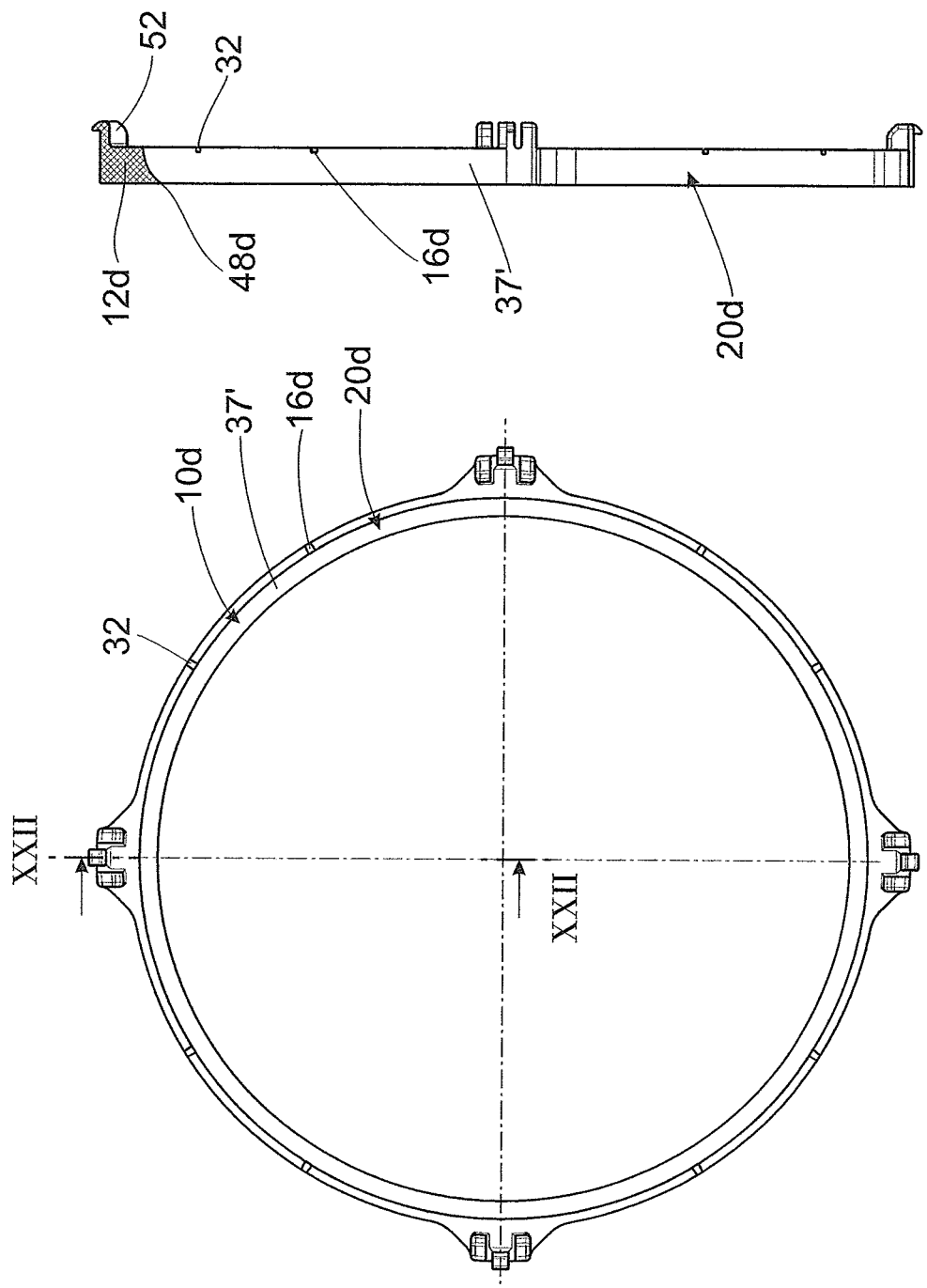

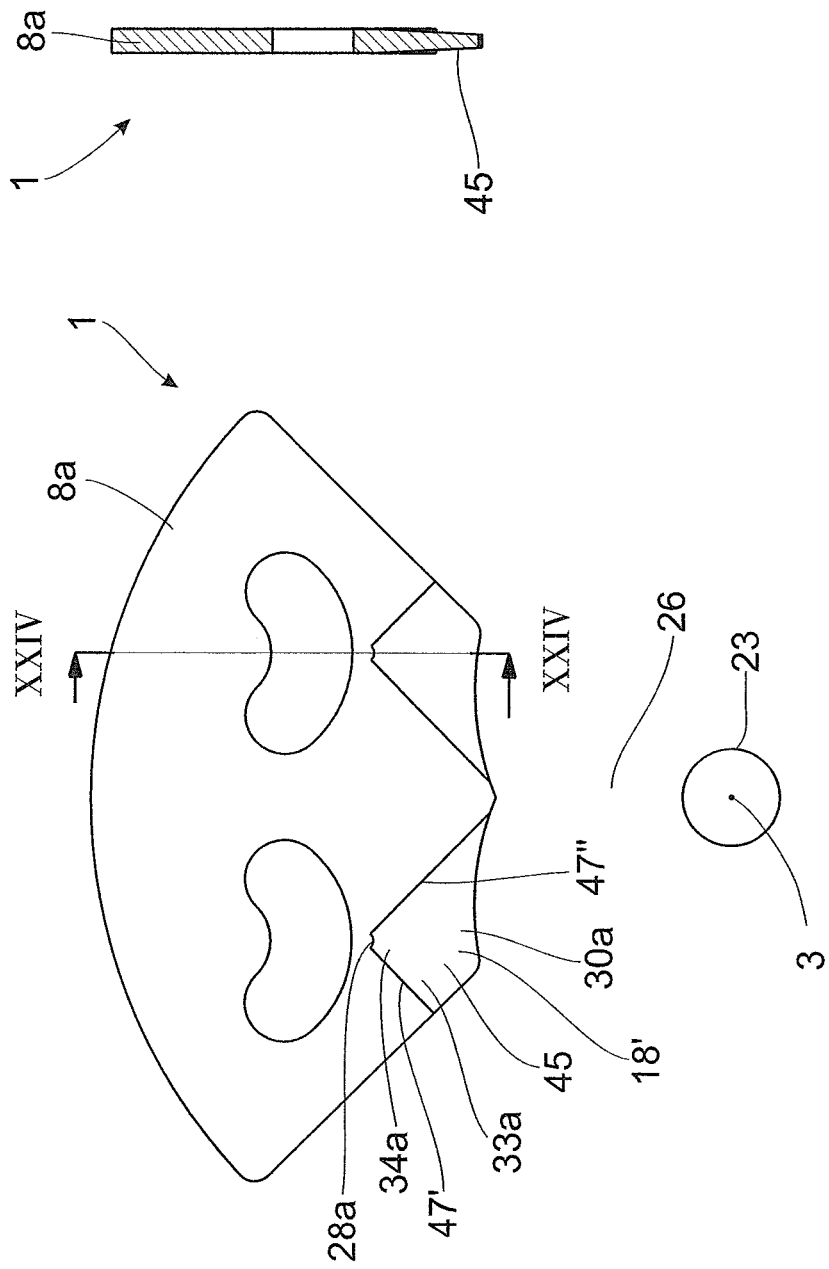

LUBRICATED ABSORBER SYSTEM

CROSS REFERENCE TO RELATED APPLICATIONS

This is a U.S. national stage of Application No. PCT/EP2018/063501 filed May 23, 2018. Priority is claimed on German Application No. DE 10 2017 211 204.2 filed Jun. 30, 2017 the content of which is incorporated herein by reference.

BACKGROUND OF THE INVENTION

1. Field of the Invention

The invention is directed to a mass damper system having at least one damper mass carrier and at least one damper mass received at the damper mass carrier so as to be movable relative to the damper mass carrier, a lubricant supply, a lubricant collector, and a lubricant distributor being associated radially offset to one another with the damper mass carrier, the lubricant supply being arranged at a shorter radial distance from a central axis than the lubricant collector, and the lubricant distributor being arranged at a greater radial distance from a central axis than the lubricant collector in order to collect, with the assistance of centrifugal force, via the lubricant collector, lubricant supplied by means of the lubricant supply and to guide the lubricant through the lubricant distributor at least to the at least one damper mass.

2. Description of the Prior Art

A mass damper system of this kind is known from WO 2015/192841 A1. The damper mass carrier is provided with two damper mass carrier elements arranged axially spaced apart from one another and is arranged to be rotatable around a central axis by fastening to a hub. The two damper mass carrier elements form axially therebetween a lubricant collector, which is provided with lubricant in the form of a liquid from a lubricant supply, and a lubricant distributor which conducts the lubricant radially outward and which, radially inside of the damper masses, leads axially between the two damper mass carrier elements into a receiving space for the damper masses. Upon exiting this orifice, the lubricant is not guided and is therefore urged radially outward under the influence of centrifugal force. While the lubricant may flow around the damper masses in this location, it is not necessarily guided to constructional units requiring intensive lubrication, for example, the coupling device by which the connection between damper mass carrier and damper masses is made.

SUMMARY OF THE INVENTION

It is the object of one aspect of the invention to construct a mass damper system in such a way that supplied lubricant is guided selectively to constructional units requiring intensive lubrication.

A mass damper system which has at least one damper mass carrier and at least one damper mass received at the damper mass carrier so as to be movable relative to it, a lubricant supply, a lubricant collector and a lubricant distributor being associated radially offset to one another with the damper mass carrier, the lubricant supply being arranged at a shorter radial distance from a central axis than the lubricant collector, and the lubricant distributor being arranged at a greater radial distance from a central axis than the lubricant collector in order to collect, via the lubricant collector, lubricant supplied by means of the lubricant supply with the assistance of centrifugal force and to guide the lubricant through the lubricant distributor at least to the at least one damper mass.

It is particularly important that there exists, at least for the lubricant collector, an association with a stop arrangement serving to limit the deflection path of the damper mass relative to the damper mass carrier and that the lubricant distributor has at least one lubricant feed that leads from the lubricant collector to at least one selected constructional unit requiring intensive lubrication and which, adjoining the extension area, opens into this selected constructional unit requiring intensive lubrication.

Since a stop arrangement provided for limiting the deflection path of the damper mass relative to the damper mass carrier must be arranged in the immediate vicinity of the damper mass in order to realize its intended function, the association of the lubricant collector with a stop arrangement of this kind allows the lubricant collector to be arranged likewise in the immediate vicinity of the damper mass. The lubricant distributor is provided in order to bridge an at-most small gap between the lubricant collector and at least one of the constructional units requiring intensive lubrication which are associated with at least one damper mass, for example, a coupling device movably connecting the damper mass to the damper mass carrier. This lubricant distributor conveys the lubricant collected at the lubricant collector directly to the at least one constructional unit requiring intensive lubrication. In this way, it is ensured that a constructional unit requiring intensive lubrication can be selectively provided with a sufficient amount of lubricant, while at the same time preventing at least residues of the lubricant from reaching areas of the mass damper system that do not require lubrication.

In addition, as a result of the accumulation of lubricant in the lubricant collector, supplying even very small amounts of a lubricant, for example, in the form of a lubricant mist, to the lubricant collector which initially acts as intermediate storage for the lubricant suffices before an amount of lubricant sufficient for a lubricating process is routed via the lubricant distributor to at least one constructional unit requiring intensive lubrication. No additional conveying function is required for this routing if both the lubricant collector and the lubricant distributor are arranged, respectively, radially inside of the respective constructional unit requiring intensive lubrication, since the centrifugal force acting during operation is sufficient to convey the lubricant.

In this regard, it is especially advantageous if the lubricant distributor has at least one lubricant feed with a lubricant input at least substantially radially outside of the lubricant collector and a lubricant output at least substantially radially outside of the lubricant input. With a relative arrangement of this kind, the lubricant can enter the lubricant input of the lubricant feed from the lubricant collector exclusively assisted by centrifugal force in order, from there, to arrive at the lubricant output of the lubricant feed and, therefore, at the respective constructional unit requiring intensive lubrication, likewise exclusively assisted by centrifugal force.

Since, as has already been stated, the lubricant collector is to be associated with a stop arrangement, it is particularly preferable that a stop arrangement that is provided radially inside of the at least one damper mass is utilized. An advantageous construction for the lubricant collector consists in that the latter at least substantially annularly surrounds a central axis and is provided at its radial side remote of the at least one damper mass with at least one opening via which, with the assistance of centrifugal force, lubricant proceeding from the lubricant supply can penetrate into at least one lubricant collecting space provided inside of the lubricant collector and can collect therein. Further, at least a portion of this lubricant should be able to flow out of the lubricant collecting space into the lubricant distributor via a lubricant passage associated with the lubricant collecting space so that this lubricant passage in the lubricant collector acts as a lubricant input of the lubricant feed and, therefore, of the lubricant distributor.

An advantageous construction for forming the lubricant collecting space consists in that the lubricant collector has at its radial side facing the at least one damper mass a covering wall with which an at least substantially radially inwardly extending radial wall is associated on at least one axial side. Further, an advantageous arrangement consists in realizing the at least one lubricant passage in the covering wall and/or in the at least one radial wall extending radially inward. In this regard, the at least one covering wall and/or the at least one radial wall of the lubricant collector has in circumferential direction at least one break in the circumference that serves as lubricant passage. In this construction, the respective lubricant passage also acts as lubricant input of the lubricant feed and accordingly of the lubricant distributor.

A further advantageous embodiment form which is of interest particularly as regards the damper mass carrier has a damper mass carrier element axially at both sides of the at least one damper mass. When the lubricant collector has at its radial side facing at least one damper mass a covering wall which has at its radial inner side in circumferential direction at least one area provided substantially at the axial center with the greatest extension radially inward and, from there, in axial direction to the respective damper mass carrier element, undergoes a reduction of the extension radially inward, i.e., is arrow-shaped, this has the result that lubricant impinging on the radial inner side of the covering wall flows out in axial direction on both sides proceeding from the tip of the arrow located substantially at the axial center and finally collects at the arrow edges at the damper mass carrier element associated with the respective flow direction. The arrow-shaped covering wall of the lubricant collector preferably has in circumferential direction at least one lubricant passage that acts as lubricant input of the lubricant supply and which is formed by axial reduction of the covering wall.

A comparable arrangement is provided when the covering wall is not arrow-shaped at its radial inner side but is formed convex. In this regard, the area substantially at the axial center has the greatest extension radially inward and, from there in axial direction to the respective damper mass carrier element, undergoes a reduction of the extension radially inward. In this arrangement also, the convex covering wall of the lubricant collector can have in circumferential direction at least one lubricant passage which acts as lubricant input of the lubricant supply and which is formed by axial reduction of the covering wall. However, it is also possible that the respective damper mass carrier element is formed at its side facing the at least one damper mass with at least one axial reduction serving as lubricant passage and, therefore, as lubricant input of the lubricant supply. Additionally, at least one of the damper mass carrier elements can have in the radially inner area a material deformation in direction away from the at least one damper mass so as to enlarge the wetting surface of the lubricant collector in this way and, accordingly, to further increase the accumulation of lubricant. The material deformation can be configured as a deep-drawn contour, for example.

Alternatively, damper mass carriers in which at least one damper mass is received in each instance axially on both sides may be of interest. In a construction of this kind, the lubricant collector can have at least one lubricant collector component which has its radial side facing the at least one damper mass a covering wall which has at its radially inner side in circumferential direction at least one area having the greatest extension radially inward at its axial side located at the farthest distance from the damper mass carrier so that, from there in axial direction to the damper mass carrier, it undergoes a reduction of the extension radially inward. When lubricant impinges on the radial inner side of the covering wall that is configured in this way, this lubricant is conveyed radially inward proceeding from the axial side with the greatest extension substantially in direction of the damper mass carrier, that is, therefore, to an area with a smaller extension radially inward, where the lubricant collects. The ability to convey lubricant further to the respective selected constructional unit requiring intensive lubrication again requires a lubricant passage provided at the lubricant collector component and/or at the damper mass carrier at the side facing the other respective constructional unit of these two constructional units—that is, the lubricant collector component or damper mass carrier. This lubricant passage acts as lubricant input of the lubricant supply and is produced by an axial reduction at the lubricant collector component and/or at the damper mass carrier. Since at least one damper mass is provided at both sides of the damper mass carrier, the construction need not be limited to an individual lubricant collector component at an axial side of the damper mass carrier; rather, lubricant collector components can also be provided at both axial sides of the damper mass carrier.

In an alternative embodiment form, a mass damper system has at least one damper mass with which a lubricant supply, a lubricant collector and a lubricant distributor are associated, the lubricant supply being provided at a shorter radial distance from a central axis than the lubricant collector or lubricant distributor so that lubricant supplied by means of the lubricant supply collects via the lubricant collector with the assistance of centrifugal force and is guided through the lubricant distributor at least to the at least one damper mass.

In this regard, it is particularly important that the lubricant collector and the lubricant distributor are combined to form a lubricant constructional unit in which at least one lubricant feed leading to at least one selected constructional unit requiring intensive lubrication opens into the at least one selected constructional unit requiring intensive lubrication so as to adjoin the extension area.

In a particularly preferable matter, the above-mentioned lubricant constructional unit comprising lubricant collector and lubricant distributor can be realized at the at least one damper mass in that the at least one damper mass has at least one lubricant collecting space radially inside of a selected constructional unit requiring intensive lubrication, the radially inner area of this lubricant collecting space acting as lubricant input of the lubricant feed, and this radially inner area greatly exceeds the radially outer area acting as lubricant output of the lubricant feed with respect to its width in circumferential direction, and the lubricant output of the lubricant feed is narrowed to an orifice which is oriented to the at least one selected constructional unit requiring intensive lubrication. As a result of this narrowing of the lubricant collecting space and of the lubricant distributor to the orifice directed toward the selected constructional unit requiring intensive lubrication, the lubricant collected in the lubricant collecting space is conveyed to the at least one selected constructional unit requiring intensive lubrication, for example, a coupling device between the damper mass and a damper mass carrier, after concentration inside the lubricant collecting space and is released via the orifice. The lubricant collecting space is preferably formed by axial reduction of the damper mass at least in the radially inner area of the lubricant constructional unit acting as lubricant input of the lubricant feed.

BRIEF DESCRIPTION OF THE DRAWINGS

The mass damper system is described in more detail in the following through embodiment examples. The drawings show:

FIG. 1 is a top view of a mass damper system with a damper mass carrier that has two damper mass carrier elements arranged at an axial distance from one another and has damper masses axially between the damper mass carrier elements and a stop arrangement radially inside of the damper masses which comprises a lubricant collector and components of a lubricant distributor;

FIG. 2 is a sectional view of the mass damper system according to a section line II-II of FIG. 1;

FIG. 3 is a separate depiction of the stop arrangement shown in FIG. 1;

FIG. 4 is a sectional view of the stop arrangement according to a section line IV-IV of FIG. 3;

FIG. 5 is as in FIG. 1, with a lubricant collector and with components of a lubricant distributor but without the use of a stop arrangement;

FIG. 6 is a sectional view of the mass damper system according to a section line VI-VI of FIG. 5;

FIG. 7 is a separate depiction of the lubricant collector shown in FIG. 5 and of the components of the lubricant distributor shown in FIG. 5;

FIG. 8 is a sectional view of the lubricant collector shown in FIG. 5 and of the components of the lubricant distributor shown in FIG. 5 according to a section line VIII-VIII of FIG. 7;

FIG. 9 is a stop arrangement formed in an arrow-like manner at its radial inner side;

FIG. 10 is a sectional view of the mass damper system according to a section line X-X of FIG. 9;

FIG. 11 is a separate depiction of the stop arrangement shown in FIG. 9;

FIG. 12 is a sectional view of the stop arrangement shown in FIG. 11 according to a section line XII-XII of FIG. 11;

FIG. 13 is a radial inner side of the stop arrangement formed convex;

FIG. 14 is a sectional view of the mass damper system according to a section line XIV-XIV of FIG. 13;

FIG. 15 is a separate depiction of the stop arrangement shown in FIG. 13;

FIG. 16 is a sectional view of the stop arrangement shown in FIG. 15 according to a section line XVI-XVI of FIG. 15;

FIG. 19 is a damper mass carrier having damper masses arranged at an axial distance from one another and a stop arrangement with at least one lubricant collector component and with at least one component of the lubricant distributor;

FIG. 20 is a sectional view of the mass damper system according to a section line XX-XX of FIG. 19;

FIG. 21 is a separate depiction of the stop arrangement shown in FIG. 19 with at least one lubricant collector component and with at least one component of the lubricant distributor;

FIG. 22 is a sectional view of the stop arrangement shown in FIG. 21 according to a section line XXII-XXII of FIG. 21;

FIG. 23 is a damper mass having a combination of a lubricant collector and the lubricant distributor in the radially inner area; and FIG. 24 is a sectional view of the damper mass shown in FIG. 23 according to a section line XXIV-XXIV of FIG. 23.

DETAILED DESCRIPTION OF THE PRESENTLY PREFERRED EMBODIMENTS

Figure 17:
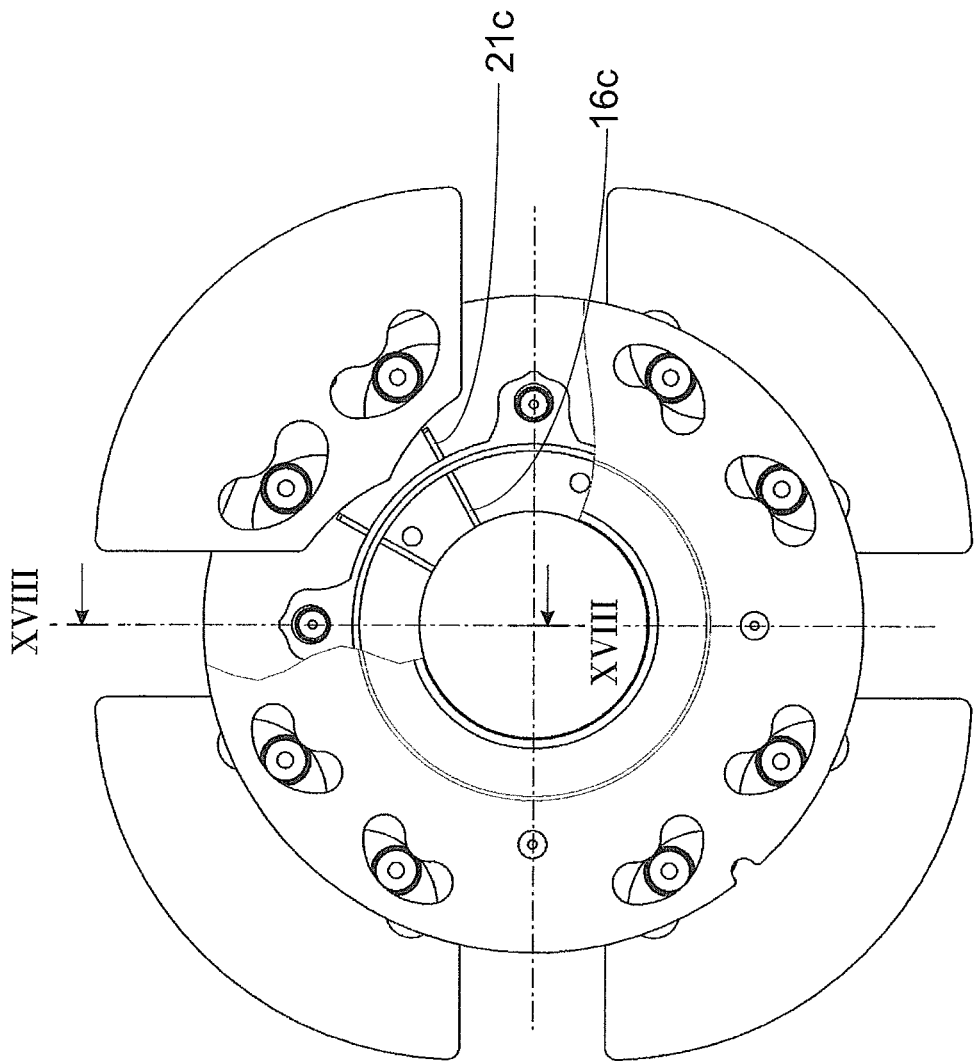
FIG. 17 is a material deformation at one of the damper mass carrier elements which is directed away from the damper mass.

FIGS. 1 and 2 show a mass damper system 1 with a damper mass carrier 2 which is rotatable around a central axis 3 and two damper mass carrier elements 4' and 4" arranged at an axial distance from one another. Each damper mass carrier element 4' or 4" is provided with guideways 5 curved in each instance and arranged such that the curve position at the greatest distance from the central axis 3 at the radial outer side of the respective guideway 5 is located in circumferential direction substantially in the central area of this guideway 5. Guideways 5 serve to receive a pin-shaped coupling device 6 in each instance, these coupling devices 6 engaging in guideways 7, likewise curved, of damper masses 8 located axially between the two damper mass carrier elements 4' and 4". The curvature of the guideways 7 of damper masses 8 extends such that the curve position which is closest to the central axis 3 at the radial inner side of the respective guideway is located substantially in the central area of this guideway 7 in circumferential direction. The respective coupling device 6 can roll in guideways 5 of the damper mass carrier elements 4' and 4" and in guideways 7 of the damper masses 8. Under the influence of centrifugal force during the rotation of the damper mass carrier 2 around the central axis 3, the damper masses 8 are urged radially outward and the coupling devices 6 are brought into a position in which they are supported at the radial outer side of the guideways 5 of damper mass carrier elements 4' and 4", preferably in the curve position at the greatest distance from the central axis 3, and in turn serve as support for the damper masses 8 supported by the radial inner side of guideways 7, preferably with the curve position at the nearest distance to the central axis 3. Torsional vibrations which are introduced through a drive, for example, through a crankshaft, not shown, of an internal combustion engine, cause the damper masses to be urged out of the above-described stable operating position in circumferential direction; but a return movement into this stable operating position is always compelled as a result of centrifugal force.

A stop arrangement 10 for the damper masses 8 is provided radially inside of the damper masses. This stop arrangement 10 substantially annularly surrounds the central axis 3 and is fastened to the two damper mass carrier elements 4' or 4" by spacers 11 which extend through eyelets 13 of the stop arrangement 10. These spacers 11 cause the two damper mass carrier elements 4' or 4" to be held at a predetermined axial distance relative to one another. The stop arrangement 10 has a covering wall 12 at its radial outer side facing the damper masses 8. When the damper masses 8 fall radially inward, for example, when the rotational speed of the damper mass carrier 2 around the central axis 3 drops below a minimum rotational speed, this covering wall 12 acts to limit the fall distance of the damper masses 8 and accordingly at least reduces an impact noise.

As is shown particularly in FIG. 4, radial walls 15' and 15" are provided at the covering wall 12 axially at both sides and extend radially inward and are interrupted in circumferential direction by lubricant passages 16 so that ultimately there remain radial wall segments 17 which are bent relative to the covering wall 12. Covering wall 12 forms the radial outer side of an at least substantially annular lubricant collecting space 18 that is limited axially on both sides by the radial walls 15' and 15". Toward the radially inner side, i.e., in direction away from the damper masses 8, the lubricant collecting space 18 has an opening 19.

The lubricant collecting space 18 is part of a lubricant collector 20 associated with the stop arrangement 10 and which cooperates with a lubricant supply 23 and, together with the latter, forms a lubricant system 14. The lubricant supply 23 is arranged radially inside of the lubricant collector 20 and is provided, for example, at an output-side transmission input shaft, not shown. The lubricant supply 23 is shown in the drawing (cf. FIG. 1) as an annular component part 24 which extends around the central axis 3 and provided with a plurality of radial cutouts 22. A lubricant mist which was delivered via a central borehole 25 of the lubricant supply 23 should exit through these radial cutouts 22 into a space 26 radially between the lubricant supply 23 and the lubricant collector 20. Provided a centrifugal force is present as a result of rotation, this lubricant mist is moved radially outward to deposit and accordingly collect in the lubricant collecting space 18 of the lubricant collector 20 at the inner side of the covering wall 12 of the latter.

Lubricant, which has collected in the lubricant collecting space 18 of the lubricant collector 20, can exit via the lubricant passages 16 of the radial wall segments 17 and can be further conveyed radially outward under the influence of a centrifugal force via lubricant passages 21 axially between the respective damper mass carrier element 4', 4" and the respective adjacent damper mass 8 until directly radially inside of selected lubrication-intensive constructional units 35, for example, the coupling devices 6. In this way, the lubricant mist is supplied to the selected lubricant-intensive constructional units 35 at exactly the required locations. Lubricant passages 16 form lubricant inputs 30 of a lubricant feed 33 of a lubricant distributor 32, while lubricant passages 21 serve as lubricant outputs 34 of the lubricant feed 33 of the lubricant distributor 32.

While the lubrication system 13 in the embodiment of FIGS. 1 to 4 utilizes the stop arrangement 10 to form a lubricant collector 20, the lubrication system 13a in the embodiment of FIGS. 5 to 8 is functionally independent from a stop arrangement in that the lubrication system 13a is itself responsible for supplying selected lubrication-intensive constructional units 35 with lubricant as well as for limiting the movement of the damper masses 8. In order to perform both of these functions, the lubrication system 13a has a lubricant trough 38 which is shown separately in FIGS. 7 and 8 and which extends with a first axial area 40 of greater diameter axially between the two damping mass carrier elements 4' and 4" (FIG. 6) and, therefore, into the axial extension area of the damper masses 8 and with a second axial area 41 of smaller diameter axially into a cutout 42 in the damper mass carrier element 4'. While the second axial area 41 ensures that the lubricant trough 38 is received in the damper mass carrier 2 in a centered manner, the first axial area 40 of the lubricant trough 38 with its larger diameter can serve as stop arrangement for the damper masses 8 if necessary. The lubricant trough 38 surrounds a lubricant collecting space 18a with a covering wall 12a, which lubricant collecting space 18a has at its inner side remote of the damper masses 8 an opening 19a for receiving lubricant supplied by a lubricant supply 23 indicated only schematically in FIG. 5. The lubricant trough 38 is part of a lubricant collector 28 which cooperates with the lubricant supply 23 in the manner already described referring to FIGS. 1 to 4.

The lubricant mist delivered through the lubricant supply 23 will deposit and accordingly collect at the inner side of the covering wall 12a after passing through space 26 radially between the lubricant supply 23 and the lubricant collector 20a when a centrifugal force is present as a result of rotation after passing through opening 19a in the lubricant collecting space 18a of the lubricant trough 38 of the lubricant collector 20a. This lubricant can exit via lubricant passages 16a of the lubricant trough 38. These lubricant passages 16a extend in the covering wall 12a as well as in radial walls 15a' and 15a" in the first axial area 40 of the lubricant trough 38 and accordingly in the area thereof having the greater diameter. The lubricant exiting via the lubricant passages 16a of the lubricant trough 38 is conveyed radially outward under the influence of a centrifugal force, as described already referring to FIGS. 1 and 2, to selected lubrication-intensive constructional units 35 by means of a lubricant feed 33 of a lubricant distributor 32 so that the lubricant mist can then be supplied to these constructional units 35 at exactly the required locations. The lubricant passages 16a form the lubricant inputs 30a of the lubricant feed 33 of a lubricant distributor 32, while lubricants passages 21a axially between the damper mass carrier elements 4' and 4" and the associated damper mass 8 serve as lubricant outputs 34 of the lubricant feed 33 of the lubricant distributor 32.

FIGS. 9 to 12 show a further construction of the lubricant system 13b in which the stop arrangement 10b is utilized for forming a lubricant collector 20b. The stop arrangement 10b has at its radial side facing the damper masses 8 a covering wall 12b whose radial side remote of the damper masses 8 has in circumferential direction at least in some areas a formation in which the largest inwardly facing radial extension 48b is provided substantially in the axial center and, from there, undergoes a reduction of the extension radially inwardly in axial direction to the respective damper mass carrier element 4b', 4b". Therefore, the above-mentioned radial side of the stop arrangement 10b is arrow-shaped radially inwardly, and the radial extension 48b forms the tip of the arrow.

In this embodiment, the respective damper mass carrier element 4', 4" acts in accordance with radial walls 15' and 15" in FIG. 1 to 4 or 15a' and 15a" in FIGS. 5 to 8 so that the damper mass carrier elements 4', 4", together with the covering wall 12b, forms a lubricant collecting space 18b of the lubricant collector 20b, and an opening 19b is associated with the radial side of the lubricant collector 20b remote of the damper masses.

Lubricant delivered by a lubricant supply 23 shown only schematically in FIG. 9 arrives in the lubricant collecting space 18b of the lubricant collector 20b after passing through space 26 radially between the lubricant supply 23 and the lubricant collector 20b and after entering the opening 19b associated with the lubricant collector 20b. As a result of the arrow-like radial side of the covering wall 12b of the stop arrangement 10b remote of the damper masses 8, the lubricant impinging on the covering wall 12b flows in axial direction in that direction in which the extent of the covering wall 12b is reduced radially inward in radial direction so that the lubricant in the lubricant collecting space 18b collects in those areas in which the damper mass carrier elements 4' and 4" adjoin the covering wall 12b. The lubricant exiting via the lubricant passages 16b is conveyed radially outward under the influence of a centrifugal force, as described already referring to FIGS. 1 and 2, to selected lubrication-intensive constructional units 35 via lubricant passages 21b axially between the damper mass carrier elements 4' and 4" and the associated damper mass 8 so that the lubricant mist can then be supplied to these constructional units 35 at exactly the required locations. The lubricant passages 16b form the lubricant inputs 30b of the lubricant feed 33 of a lubricant distributor 32, while lubricant passages 21b serve as lubricant outputs 34 of the lubricant feed 33 of the lubricant distributor 32.

A covering wall 12c is also provided in the embodiment of the lubrication system 13c shown in FIGS. 13 to 18 at the radial side facing the damper masses 8. Lubrication system 13c differs from lubrication system 13b according to the embodiment shown in FIGS. 9 to 12 in that the covering wall 12c of the stop arrangement 10c has at its radial side remote of the damper masses 8 in circumferential direction at least in some areas a formation which, instead of being arrow-shaped, is formed substantially convex radially inwardly, specifically again with the greatest radial extension 48c substantially in the axial center area and, from there, undergoes a reduction of the extension radially inwardly in axial direction to the respective damper mass carrier element 4', 4".

In this embodiment also, the respective damper mass carrier element 4', 4" acts in accordance with radial walls 15' and 15" in FIG. 1 to 4 or 15a' and 15a" in FIGS. 5 to 8 so that the damper mass carrier elements 4', 4", together with the covering wall 12c, form a lubricant collecting space 18c of the lubricant collector 20c, and an opening 19c is associated with the radial side of the lubricant collector 20c remote of the damper masses.

Lubricant delivered by a lubricant supply 23 shown only schematically in FIG. 13 arrives in the lubricant collecting space 18c of the lubricant collector 20c after passing through space 26 radially between the lubricant supply 23 and the lubricant collector 20c and after entering the opening 19c associated with the lubricant collector 20c. As a result of the curvature of the radial side of the covering wall 12c of the stop arrangement 10c remote of the damper masses 8, the lubricant impinging on the covering wall 12b flows in axial direction in that direction in which the extent of the covering wall 12c is reduced radially inward in radial direction so that the lubricant in the lubricant collecting space 18c collects in those areas in which the damper mass carrier elements 4' and 4" adjoin the covering wall 12b. This lubricant flows out via lubricant passages 16c. As distinct from the embodiments described thus far, these lubricant passages 16c are not provided in the lubricant collector 20c but rather in the damper mass carrier elements 4' and 4", namely, in the wall sides thereof facing the lubricant collector 20c.

The lubricant conducted via the lubricant passages 16c is conveyed radially outward under the influence of a centrifugal force to selected lubrication-intensive constructional units 35 via lubricant passages 21c axially between the damper mass carrier elements 4' and 4" and the associated damper mass 8 so that the lubricant mist can then be supplied to these constructional units 35 at exactly the required locations. Lubricant passages 16c form the lubricant inputs 30 of the lubricant feed 33 of a lubricant distributor 32, while lubricant passages 21c serve as lubricant outputs 34 of the lubricant feed 33 of the lubricant distributor 32.

Figure 18:
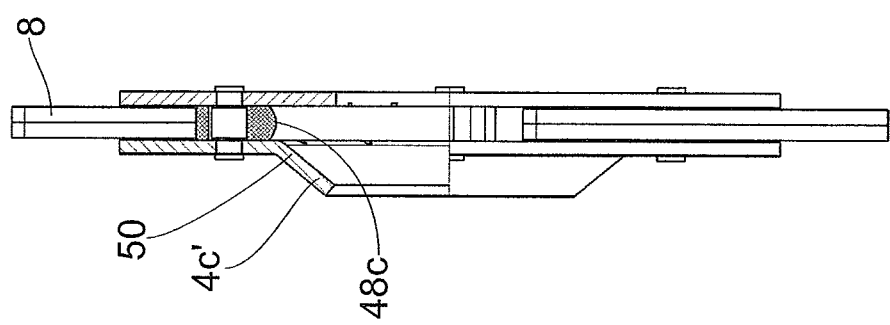
FIG. 18 is a sectional view of the mass damper system according to a section line XVIII-XVIII of FIG. 17.

Finally, FIGS. 17 and 18 show this embodiment with a damper mass carrier element 4c' which has a material deformation 50 directed away from the at least one damper mass 8. This material deformation 50 can be produced by a deep drawing process. The wetting surface of the damper mass carrier element 4c' for lubricant can be considerably enlarged by this step.

In the embodiment of the lubrication system 13 according to the FIGS. 19 to 22, the damper mass carrier 2 has only one individual damper mass carrier element 4, which receives damper masses 8' or 8" axially at both sides. As is shown in FIG. 20, a lubricant collector component 37' of a lubricant collector 20d is provided at a side of the damper mass carrier element 4 radially inside of the damper masses 8". The lubricant collector component 37' is associated with a stop arrangement 10d and has a radially outer covering wall 12d. Covering wall 12d has at its radial side remote of the damper masses 8" in circumferential direction at least in some areas a formation which is formed to be substantially concave radially inward, namely, with the greatest radial extension 48d radially inwardly at the location of the greatest axial distance from the damper mass carrier element 4, and undergoes a reduction of the extension radially inwardly in direction of the damper mass carrier element 4. Since the damper mass carrier element 4 acts in accordance with a first radial wall, and the radial extension 48d acts in accordance with a second radial wall, damper mass carrier element 4, covering wall 12d and radial extension 48d together form a lubricant collecting space 18d of the lubricant collector 20d, an opening 19d being associated with the radial side thereof remote of the damper masses 8".

Lubricant delivered by a lubricant supply 23 shown only schematically in FIG. 19 arrives in a lubricant collecting space 18d of the lubricant collector component 37' of the lubricant collector 20d after passing through space 26 radially between the lubricant supply 23 and the lubricant collector component 37' of the lubricant collector 20d and after entering the opening 19d associated with the lubricant collector component 37', and the lubricant is collected in this lubricant collecting space 18d. As a result of the curvature of the radial side of the covering wall 12d of the stop arrangement 10d remote of the damper masses 8", the lubricant impinging on the covering wall 12d flows in axial direction in that direction in which the extent of the covering wall 12d is reduced radially inward in radial direction so that the lubricant in the lubricant collecting space 18d collects in that area in which the damper mass carrier element 4 adjoins the covering wall 12d. This lubricant flows out via lubricant passages 16d and is conducted radially outward under the influence of a centrifugal force to selected lubrication-intensive constructional units 35 by means of lubricant passages 21d of a lubricant feed 33 of a lubricant distributor 32, which lubricant passages 21d are provided axially between damper mass carrier element 4' and damper mass 8", so that the lubricant mist can then be supplied to these constructional units 35 at exactly the required locations. Lubricant passages 16d form the lubricant inputs 30 of the lubricant feed 33, and lubricant passages 21d serve as lubricant outputs 34.

FIG. 20 shows the lubricant system 13 with only one lubricant collector component 37' which is provided at the side of the damper masses 8" of the damper mass carrier element 4. The lubricant collector component 37' locks in a correspondingly shaped recess in the damper mass carrier element 4 by a catch connection 52 (FIG. 22). It will be appreciated that instead of this arrangement the lubricant collector component can also be provided at the opposite side of the damper mass carrier element 4, or the lubricant collector 20*d* is formed on both sides of the damper mass carrier element 4 with a lubricant collector component in each instance.

In FIGS. 23 and 24, the lubricant collector and the lubricant distributor are combined to form a lubricant constructional unit 45 which is provided in the radially inner area of the respective damper mass 8*a*. The respective lubricant constructional unit 45 is formed much wider in circumferential direction in the radially inner area than in the radially outer area which terminates in an orifice 28*a*. Accordingly, the respective lubricant constructional unit 45 narrows radially outward in that the above-mentioned radially inner area is connected via guide bevels 47', 47" to the above-mentioned outer area. Lubricant which was delivered through a lubricant supply 23, shown schematically, enters the lubricant constructional unit 45 after passing through space 26 radially between the lubricant supply 23 and the lubricant constructional unit 45 and collects at the guide bevels 47' and 47" and so as to be conveyed radially outward with the assistance of centrifugal force until it exits the lubricant constructional unit 45 through the orifice 28*a* and arrives in the selected constructional unit 35 requiring intensive lubrication. The wider radially inner area of the constructional unit 45 serves as lubricant input 30*a* of a lubricant feed 33*a* and, on the other hand, the narrower radially outer area of the lubricant constructional unit 45 serves as lubricant output 34*a* of the lubricant feed 33*a*.

As is shown in FIG. 24, the lubricant constructional unit 45 also narrows in cross section from the radially inner side to the radially outer side. The lubricant constructional unit 45 also serves generally as lubricant collecting space 18' which is formed by axial reduction of the damper mass 8*a* chiefly in the radially inner area of the lubricant constructional unit 45 acting as lubricant input 30*a* of the lubricant feed 33*a*.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A mass damper system comprising:
at least one damper mass
at least one damper mass carrier configured to moveably receive the at least one damper mass;
a lubricant collector;
a lubricant supply arranged at a shorter radial distance from a central axis than the lubricant collector; and
a lubricant distributor arranged at a greater radial distance from a central axis than the lubricant collector and configured to collect, via the lubricant collector, lubricant supplied by the lubricant supply with assistance of centrifugal force and to guide the lubricant through the lubricant distributor at least to the at least one damper mass;
wherein the lubricant collector, the lubricant supply, and the lubricant distributor are associated radially offset to one another with the at least one damper mass carrier;
an association with a stop arrangement, at least for the lubricant collector, configured to limit a deflection path of the at least one damper mass relative to the at least one damper mass carrier; and
at least one lubricant feed of the lubricant distributor that leads from the lubricant collector to at least one selected constructional unit requiring intensive lubrication and which, adjoining an extension area, opens into this selected constructional unit requiring intensive lubrication.

2. The mass damper system according to claim 1, wherein the at least one lubricant feed of the lubricant distributor comprises:
at least one lubricant input provided substantially radially outside of the lubricant collector; and
at least one lubricant output provided substantially radially outside of the at least one lubricant input and substantially radially inside of at least one selected constructional unit requiring intensive lubrication.

3. The mass damper system according to claim 1, wherein the lubricant collector substantially annularly surrounds the central axis and has at least one lubricant collecting space which has at the radial side of the lubricant collector remote of the at least one damper mass at least one opening configured to allow lubricant to access the lubricant collecting space; and
the at least one lubricant collecting space is provided with at least one lubricant passage configured to allow lubricant collected inside of the lubricant collecting space to flow out into at least one lubricant input of the at least one lubricant feed of the lubricant distributor.

4. The mass damper system according to claim 3, wherein the lubricant collector has at its radial side facing the at least one damper mass one of:
a covering wall with which an at least substantially radially inwardly extending radial wall or
a damper mass carrier element is associated on at least one axial side to form the lubricant collecting space.

5. The mass damper system according to claim 4, wherein the stop arrangement for the at least one damper mass is provided radially inside the at least one damper mass, wherein the stop arrangement encloses the central axis in a ring-shaped manner and is fastened to the two damper mass carrier elements or by spacers that pass through eyelets of the stop arrangement.

6. The mass damper system according to claim 4, wherein the one of the covering wall and/or the at least one radial wall and/or the damper mass carrier element are provided with at least one lubricant passage.

7. The mass damper system according to claim 6, wherein the at least one covering wall and/or the at least one radial wall of the lubricant collector have at least one circumferential break in circumferential direction serving as lubricant passage.

8. The mass damper system according to claim 4 with a damper mass carrier having a respective damper mass carrier element axially at both sides of the at least one damper mass, wherein the lubricant collector has at its radial side facing the at least one damper mass a respective covering wall which is provided at its radial inner side in circumferential direction with at least one area which has within its axial extension area an area with a greatest extension radially inward and, from there, in axial direction to the respective adjacent damper mass carrier element, undergoes a reduction of the extension radially inward.

9. The mass damper system according to claim 8, wherein the at least one covering wall of the lubricant collector has in circumferential direction at least one axial reduction serving as lubricant passage and accordingly forming the at least one lubricant input of the at least one lubricant feed of the lubricant distributor.

10. The mass damper system according to claim 8,
wherein the covering wall of the lubricant collector is formed in a substantially arrow-shaped manner at its radial inner side in axial direction,
wherein the substantially axial central area has a greatest radial extension radially inward and, from the location of the greatest radial extension in axial direction to the respective damper mass carrier element, undergoes a reduction of the extension radially inward.

11. The mass damper system according to claim 8,
wherein the covering wall of the lubricant collector is formed substantially convex at its radial inner side in axial direction,
wherein the substantially axial central area has a greatest radial extension radially inward and, from the location of the greatest radial extension in axial direction to the respective damper mass carrier element, undergoes a reduction of the extension radially inward.

12. The mass damper system according to claim 8,
wherein the covering wall of the lubricant collector is formed at least substantially concave at its radial inner side in axial direction,
wherein substantially an axial area that is at the farthest distance from the adjacent damper mass carrier element has a greatest radial extension radially inward and, from the location of the greatest radial extension in axial direction to the damper mass carrier element, undergoes a reduction of the extension radially inward.

13. The mass damper system according to claim 12, wherein the damper mass carrier receives at least one damper mass in each instance axially on both sides, and the lubricant collector in association with at least one of the damper masses has at least one lubricant collector component.

14. The mass damper system according to claim 13, wherein at least one of the lubricant collector component and the damper mass carrier are provided at the side facing the respective other one of these two constructional unit, such that the lubricant collector component or the damper mass carrier, with at least one axial reduction serving as lubricant passage forms the at least one lubricant input of the at least one lubricant feed of the lubricant distributor.

15. The mass damper system according to claim 8, wherein the respective damper mass carrier element has at its side facing the at least one damper mass at least one axial reduction serving as lubricant passage and accordingly forming the lubricant output and/or an axial reduction serving as lubricant passage and accordingly forming the lubricant output of the lubricant feed of the lubricant distributor.

16. The mass damper system according to claim 8, wherein at least one damper mass carrier element has in a radially inner area a material deformation in direction away from the at least one damper mass.

17. The mass damper system according to claim 1, wherein the stop arrangement contains the lubricant collector.

18. The mass damper system according to claim 1, wherein the damper mass carrier has two damper mass carrier elements arranged at a spacing from one another, and axially between the damper mass carrier elements via damper masses, and, radially within the damper mass, via the stop arrangement which comprises a respective lubricant collector and respective components of a lubricant distributor.

19. A mass damper system comprising:
at least one damper mass with which a lubricant supply, a lubricant collector and a lubricant distributor are associated, the lubricant supply being provided at a shorter radial distance from a central axis than the lubricant collector or lubricant distributor so that, with assistance of centrifugal force, lubricant supplied by means of the lubricant supply collects via the lubricant collector and is guided through the lubricant distributor at least to the at least one damper mass,
wherein the lubricant collector and the lubricant distributor form a lubricant constructional unit in which at least one lubricant feed leading to at least one selected constructional unit requiring intensive lubrication opens into the at least one selected constructional unit requiring intensive lubrication so as to adjoin an extension area.

20. The mass damper system according to claim 19, wherein the lubricant constructional unit is at the at least one damper mass such that the at least one damper mass has at least one lubricant collecting space radially inside of at least one selected constructional unit requiring intensive lubrication, a radially inner area of this lubricant collecting space acting as a lubricant input of the at least one lubricant feed and an radially outer area of this lubricant collecting space acting as lubricant output of the at least one lubricant feed, wherein the lubricant output is narrowed to an orifice which is oriented to the at least one selected constructional unit requiring intensive lubrication,
wherein 24 the lubricant assembly tapers in cross-section from radially inside to radially outside.

21. The mass damper system according to claim 20, wherein the radially inner area of the lubricant collecting space acting as the lubricant input of the lubricant feed greatly exceeds the radially outer area of the lubricant collecting space acting as lubricant output of the lubricant feed with respect to its width in circumferential direction.

22. The mass damper system according to claim 21, wherein the lubricant collecting space is formed by axial reduction of the at least one damper mass at least in the radially inner area of the lubricant constructional unit acting as the lubricant input of the at least one lubricant feed.

* * * * *